(12) United States Patent
Mao et al.

(10) Patent No.: US 11,277,391 B2
(45) Date of Patent: Mar. 15, 2022

(54) PACKET SENDING METHOD AND APPARATUS

(71) Applicant: HUAWEI TECHNOLOGIES CO., LTD., Shenzhen (CN)

(72) Inventors: Lihua Mao, Nanjing (CN); Bizhen Liu, Nanjing (CN); Xueming Mei, Nanjing (CN); Yulei Zhang, Nanjing (CN); Bing Ni, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 292 days.

(21) Appl. No.: 16/710,993

(22) Filed: Dec. 11, 2019

(65) Prior Publication Data
US 2020/0120078 A1    Apr. 16, 2020

Related U.S. Application Data

(63) Continuation of application No. PCT/CN2018/098212, filed on Aug. 2, 2018.

(30) Foreign Application Priority Data

Aug. 2, 2017 (CN) .................. 201710653308.X

(51) Int. Cl.
*H04L 29/06* (2006.01)
*H04L 45/74* (2022.01)
*H04L 61/2503* (2022.01)

(52) U.S. Cl.
CPC ............ *H04L 63/061* (2013.01); *H04L 45/74* (2013.01); *H04L 61/2503* (2013.01);
(Continued)

(58) Field of Classification Search
CPC ........... H04L 63/0485; H04L 29/06959; H04L 63/061
See application file for complete search history.

(56) References Cited

U.S. PATENT DOCUMENTS

2003/0237003 A1* 12/2003 Rautiainen ............ H04L 63/061
                                                              726/15
2010/0318880 A1* 12/2010 Choi .................... H04N 21/434
                                                              714/758
2015/0263866 A1    9/2015 Tsuchiya

FOREIGN PATENT DOCUMENTS

CN              1845549 A      10/2006
CN          101252517 A        8/2008
(Continued)

OTHER PUBLICATIONS

International search report dated Oct. 26, 2018 from corresponding application No. PCT/CN2018/098212.
(Continued)

*Primary Examiner* — Esther B. Henderson
(74) *Attorney, Agent, or Firm* — Hauptman Ham, LLP

(57) ABSTRACT

A method includes obtaining, by a first network device comprising a processor, characteristic information from an encrypted packet received from a second network device based on a determination that the first network device cannot decrypt the encrypted packet. The first network device is free from having an internet protocol security (IPsec) security association (SA), and the second network device has the IPsec SA. The method also includes generating, by the first network device, an informational exchange packet when the first network device obtains, based on the characteristic information, an internet key exchange (IKE) SA corresponding to the characteristic information. The informational exchange packet instructs the second network device to delete the IPsec SA on the second network device. The method further includes sending, by the first network device, the informational exchange packet to the second network device.

20 Claims, 6 Drawing Sheets

(52) U.S. Cl.
CPC ...... *H04L 63/0272* (2013.01); *H04L 63/0428* (2013.01); *H04L 63/20* (2013.01)

(56) References Cited

FOREIGN PATENT DOCUMENTS

| | | |
|---|---|---|
| CN | 102055733 A | 5/2011 |
| CN | 102148810 A | 8/2011 |
| CN | 103107950 A | 5/2013 |
| CN | 103716196 A | 4/2014 |
| CN | 106487802 A | 3/2017 |
| CN | 107682284 A | 2/2018 |
| EP | 3605976 A1 | 2/2020 |

OTHER PUBLICATIONS

Kaufman et al: "Internet Key Exchange Protocol Version 2 (IKEv2L RFC 7296", Oct. 12, 2014 (Oct. 25, 2014), pp. 1-142,XP015104486, total 142 pages.
The extended European search report dated Mar. 18, 2020 from corresponding application No. EP 18840991.6.

\* cited by examiner

PACKET SENDING METHOD AND APPARATUS

CROSS-REFERENCE TO RELATED APPLICATIONS

This application is a continuation of International Application No. PCT/CN2018/098212, filed on Aug. 2, 2018, which claims priority to Chinese Patent Application No. 201710653308.X, filed on Aug. 2, 2017. The disclosures of the aforementioned applications are hereby incorporated by reference in their entireties.

TECHNICAL FIELD

The present disclosure relates to the field of communications technologies, and specifically, to a packet sending method and a network device.

BACKGROUND

In use of internet protocol security (IPsec), two security associations (SA) are generated through negotiation: an internet key exchange (IKE) SA and an IPsec SA. The internet key exchange SA is used to establish an SA for signaling negotiation between two endpoints, and all signaling (including negotiation of a subsequent IPsec SA) is protected by the IKE SA, and is encrypted or decrypted before being sent or received. The IPsec SA is used to encrypt and decrypt a user data flow in a network.

In a scenario in which an IKE SA obtains an IPsec tunnel through automatic negotiation, there may be a fault scenario: When the IKE SA works normally, but there is an IPsec SA at one end of the IPsec tunnel, and there is no IPsec SA at the other end, traffic forwarded through the tunnel is interrupted because a packet cannot be normally encrypted or decrypted on a device lacking the IPsec SA. When a life cycle of the IPsec SA is to expire, new IPsec SAs are re-established at the two ends of the IPsec tunnel through IKE negotiation. In this case, forwarding of a data flow is restored and communication continues. However, in consideration of a factor such as performance, a relatively long life cycle is usually set, causing an excessively long service interruption time, reducing service processing efficiency, and further reducing service experience of a user.

SUMMARY

According to a packet sending method and a network device provided in embodiments of the present disclosure, a problem that a service interruption time is excessively long when a first network device and a second network device perform internet protocol security IPsec communication, but there is no IPsec security association SA on the first network device and there is an IPsec SA on the second network device, is resolved, thereby improving network reliability and service experience of a user.

To resolve the foregoing problem, an aspect of the present disclosure provides a packet sending method, where the method is applied to a network scenario in which a first network device and a second network device perform internet protocol security IPsec communication, there is no IPsec security association SA on the first network device, and there is an IPsec SA on the second network device, and the method includes: receiving, by the first network device, an encrypted packet from the second network device; obtaining, by the first network device, characteristic information when the first network device cannot decrypt the encrypted packet; generating, by the first network device, an informational exchange packet when the first network device obtains, based on the characteristic information, an internet key exchange IKE SA corresponding to the characteristic information, where the informational exchange packet instructs the second network device to delete the IPsec SA on the second network device; and sending, by the first network device, the informational exchange packet to the second network device.

In some embodiments, the first network device receives a negotiation packet sent by the second network device after the second network device deletes the IPsec SA, and generates a new IPsec SA based on the negotiation packet, to decrypt a subsequently received encrypted packet.

The first network device obtains the characteristic information when the first network device cannot decrypt the encrypted packet, and sends the informational exchange packet to the second network device when the first network device obtains the corresponding IKE SA based on the characteristic information, to trigger the second network device to re-initiate negotiation with the first network device over a new IPsec SA without a need to conduct negotiation over the new IPsec SA when a life cycle of the IPsec SA is to expire, thereby shortening a service interruption time, improving service processing efficiency, and improving user experience.

In some embodiments, the first network device discards the encrypted packet when the first network device cannot obtain, based on the characteristic information, the IKE SA corresponding to the characteristic information.

The encrypted packet is discarded, so that accumulation of useless packets on the device is avoided, and storage space of the device is saved.

In some embodiments, the characteristic information includes an IPsec security parameter index SPI; and correspondingly, that the first network device obtains, based on the characteristic information, an IKE SA corresponding to the characteristic information includes: obtaining, by the first network device, the IKE SA based on a mapping relationship between the IPsec SPI and the IKE SA.

According to a method of obtaining the IKE SA by using the IPsec SPI, the first network device can send the informational exchange packet in a timely and accurate manner, thereby accelerating a service restoration speed.

In some embodiments, the characteristic information includes a source IP address and a destination IP address; and correspondingly, that the first network device obtains, based on the characteristic information, an IKE SA corresponding to the characteristic information includes: obtaining, by the first network device, the IKE SA based on a mapping relationship between the IKE SA and a combination of the source IP address and the destination IP address.

According to a method of obtaining the IKE SA by using the source IP address and the destination IP address, the first network device can send the informational exchange packet in a timely manner when the first network device cannot accurately hit the IKE SA by using the IPsec SPI, thereby improving fault tolerance of the device.

In some embodiments, the characteristic information further includes an IKE identifier; and correspondingly, that the first network device obtains, based on the characteristic information, an IKE SA corresponding to the characteristic information includes: obtaining, by the first network device, the IKE SA based on a mapping relationship between the IKE SA and a combination of the source IP address, the destination IP address, and the IKE identifier.

According to a method of obtaining the IKE SA by using the source IP address, the destination IP address, and the IKE identifier, fault tolerance is improved, and further, accuracy of hitting the IKE SA is improved to some extent.

In some embodiments, the characteristic information further includes a protocol number; and correspondingly, that the first network device obtains, based on the characteristic information, an IKE SA corresponding to the characteristic information includes: obtaining, by the first network device, the IKE SA based on a mapping relationship between the IKE SA and a combination of the source IP address, the destination IP address, and the protocol number.

According to a method of obtaining the IKE SA by using the source IP address, the destination IP address, and the protocol number, fault tolerance is improved, and further, accuracy of hitting the IKE SA is improved.

In some embodiments, the characteristic information further includes a protocol number; and correspondingly, that the first network device obtains, based on the characteristic information, an IKE SA corresponding to the characteristic information includes: obtaining, by the first network device, the IKE SA based on a mapping relationship between the IKE SA and a combination of the source IP address, the destination IP address, the IKE identifier, and the protocol number.

According to a method of obtaining the IKE SA by using the source IP address, the destination IP address, the IKE identifier, and the protocol number, fault tolerance is improved, and further, accuracy of hitting the IKE SA is improved.

In some embodiments, that the first network device cannot decrypt the encrypted packet includes at least one of the following manners: the IPsec SA cannot be obtained based on an IPsec security parameter index SPI in the encrypted packet; the IPsec SA cannot be obtained based on a source IP address and a destination IP address in the encrypted packet; and the IPsec SA cannot be obtained based on the source IP address, the destination IP address, and a protocol number that are in the encrypted packet.

In this two-time search manner, accuracy of determining whether decryption can be performed can be increased. The second search is to check a result of the first search, to effectively avoid a misjudgment.

In some embodiments, the first network device obtains the IKE identifier based on a mapping relationship between the destination IP address and the IKE identifier; the first network device obtains the IKE identifier based on a mapping relationship between the IKE identifier and a combination of the destination IP address and the source IP address; the first network device obtains the IKE identifier based on a mapping relationship between the IKE identifier and a combination of the destination IP address, the source IP address, and the protocol number; or the first network device obtains the IKE identifier based on a mapping relationship between the IKE identifier and a combination of the destination IP address, the source IP address, the protocol number, a source port number, and a destination port number.

Another aspect of the present disclosure provides a first network device, and the first network device is configured to perform the method in accordance with one or more embodiments. In some embodiments, the first network device includes a module configured to perform the method in accordance with one or more embodiments.

Another aspect of the present disclosure provides a first network device, and the first network device includes a processor, a transceiver, a random access memory, a read-only memory, and a bus. The processor is separately coupled to a transceiver, the random access memory, and the read-only memory by using the bus. When the first network device needs to be run, the first network device is started by using a basic input/output system built into the read-only memory or a bootloader booting system in an embedded system, to boot the first network device to enter a normal running state. After entering the normal running state, the first network device runs an application program and an operating system in the random access memory, to enable the processor to perform the method according to one or more embodiments.

Another aspect of the present disclosure provides a first network device that includes a central processing unit, a forwarding entry memory, a physical interface network adapter, and a network forwarding processor. The first network device is configured to perform the method in accordance with one or more embodiments. In some embodiments, the first network device includes a module configured to perform the method in accordance with one or more embodiments.

Another aspect of the present disclosure provides a computer readable medium. The computer readable medium includes an instruction, and when the instruction runs on a computer, the computer is enabled to perform the method according to one or more embodiments.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments recorded in this application, and a person of ordinary skill in the art may still derive other drawings from these accompanying drawings.

DESCRIPTION OF EMBODIMENTS

Figure 1A:
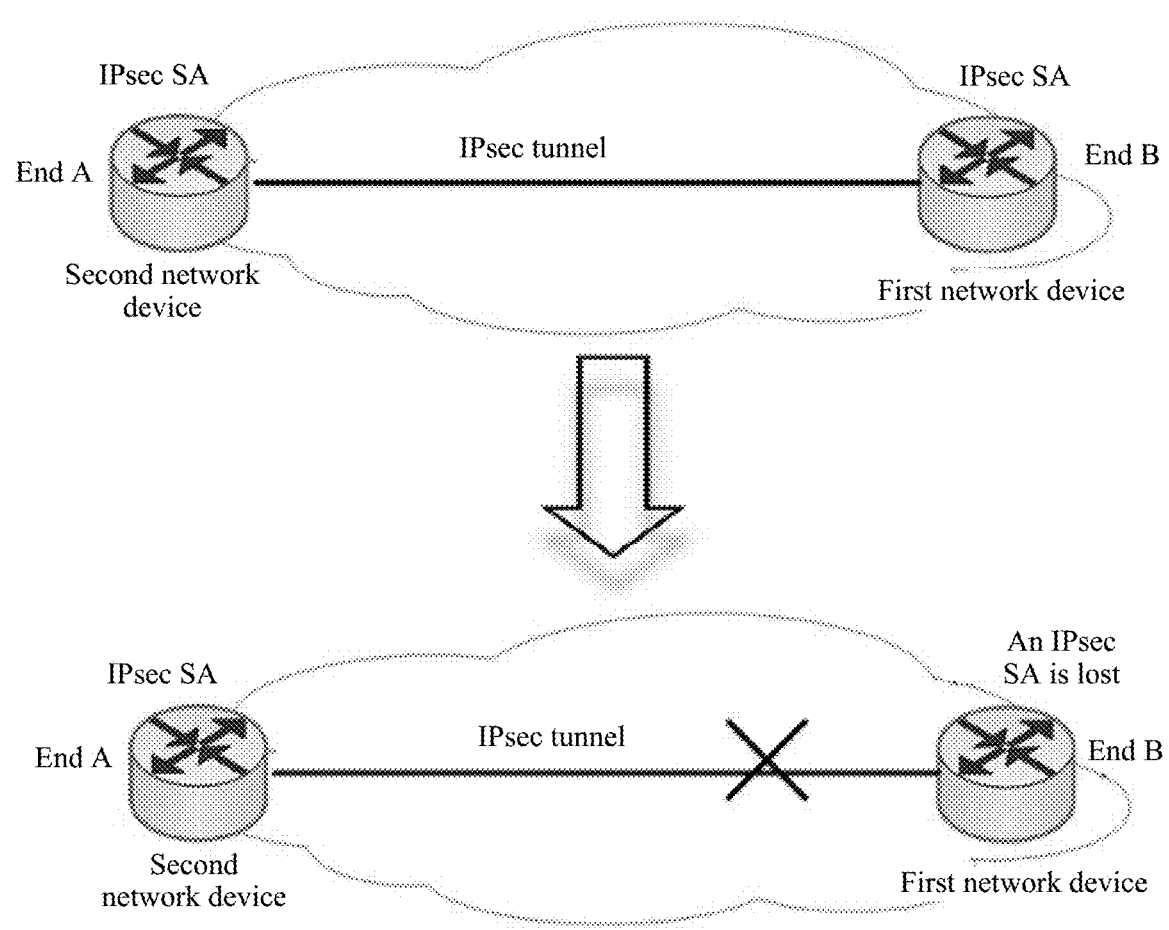
FIG. 1a is a schematic diagram of an application scenario of packet sending according to some embodiments.

To make a person skilled in the art understand the solutions in the present disclosure better, the following describes several embodiments in more detail with reference to the accompanying drawings and implementations. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Before the technical solutions in the embodiments of the present disclosure are described, application scenarios related to the embodiments of the present disclosure are first described. The present disclosure relates to a scenario in which secure communication is performed by using IPsec in an internet protocol (IP) network.

The IPsec is a set of protocols that are formulated by an internet engineering task force (IETF) to provide an interoperable, high-quality, and encryption-based security service for supporting an internet protocol version 4 (Ipv4) and supporting an internet communications protocol version 6 (IPv6).

The security service provided by the IPsec is provided at an IP layer, and provides protection for the IP layer and all protocols at the IP layer in a standard manner. The IPsec may be used to protect a communication path between two endpoints, for example, one or more paths between a pair of hosts, between a pair of security gateways, or between a security gateway and a host. In this case, the IPsec is mainly used to establish a layer-3 tunnel on an Internet to provide an IPsec virtual private network (VPN) service, and is widely applied to network devices such as a host, a router, and a security gateway.

The IPsec is a protocol suite, and mainly includes a security protocol, an encryption algorithm and an authentication algorithm used in the security protocol, and a related key management protocol. There are two IPsec security protocols: an authentication header (AH) and an encapsulating security payload (ESP). The AH and the ESP each have two encapsulation modes: a tunnel mode and a transport mode. The key management protocol is an internet key exchange (, IKE) protocol.

The IPsec implements the security service by using two security protocols: the AH and the ESP. In addition, the IKE protocol may be used to provide the IPsec with services such as automatically negotiating an exchange key, and establishing and maintaining a security association, to simplify use and management of the IPsec.

Concepts related to the IPsec include a data flow, a security association (SA), a security policy, a tunnel, and the like. For ease of understanding the present disclosure, brief descriptions are separately provided below.

1. Data Flow

The data flow is a flow that includes a group of packets with a same packet eigenvalue, and the packet eigenvalue includes but is not limited to: a source IP address, a destination IP address, a protocol number, and the like that are included in an IP packet header; and a source port number, a destination port number, and the like that are included in a TCP/UDP packet header. A combination of the several eigenvalues may also be referred to as an N-tuple (N is a positive integer greater than or equal to 1), and the N-tuple is used to identify one data flow. For example, the data flow may be identified by using a 5-tuple that includes a source IP address, a destination IP address, a protocol number, a source port number, and a destination port number, or may be identified by using a 3-tuple that includes a source IP address, a destination IP address, and a protocol number. The IPsec can apply different security protection to different data flows. For example, different security protocols, algorithms, or keys are used for different data flows.

2. Security Association (SA)

The IPsec provides secure communication between two endpoints, and the two endpoints are referred to as IPsec peers. The security association is an agreement between the IPsec peers on a specific element, for example, a used protocol (an AH, an ESP, or a combination thereof), a protocol encapsulation mode (a transport mode and a tunnel mode), a security parameter index (Security Parameter Index, SPI), a cipher algorithm, a shared key for protecting data in a specific data flow, or a life cycle of a key.

The security association is unidirectional. If two hosts (A and B) use the ESP to perform secure communication, the host A needs two SAs. One SA processes an outbound packet, and the other SA processes an inbound packet. Similarly, the host B also needs two SAs.

The security association is also related to a protocol. If the host A and the host B perform secure communication by using both the AH and the ESP, the host A needs four SAs: two SAs of the AH protocol (one SA in an inbound direction and one SA in an inbound direction) and two SAs of the ESP protocol (one SA in the inbound direction and one SA in the inbound direction). Similarly, the host B also needs four SAs.

The security association is uniquely identified by a 3-tuple. The 3-tuple includes an SPI, a destination IP address, and a security protocol number (an AH protocol number or an ESP protocol number). The SPI is used to identify different SAs with a same IP address and a same security protocol, and is a 32-bit value generated for uniquely identifying the SA. The SPI is transmitted in an AH header and an ESP header. The SPI may include an IPsec SPI and an IKE SPI. The IPsec SPI is used to identify an IPsec SA, and the IKE SPI is used to identify an IKE SA.

The security association has a life cycle. The life cycle is calculated in two manners:

a time-based manner in which the life cycle is updated every specified length of time; and a traffic-based manner in which the life cycle is updated each time a specified amount of data (bytes) is transmitted.

The security association fails regardless of a type of a life cycle that expires first. When the security association is to fail, the IKE establishes a new IKE security association for IPsec negotiation. In this way, the new security association is ready when the old security association fails.

Usually, security associations include an IKE SA and an IPsec SA. The IKE SA is responsible for establishing and maintaining the IPsec SA and plays a control role. The IPsec SA is responsible for encrypting a specific data flow.

3. Security Policy

The security policy specifies a specific security measure for a specific data flow, and is usually configured by a user manually. A plurality of rules are configured in one access control list to define a data flow. The access control list is referenced in the security policy to determine a data flow that needs to be protected.

An IPsec endpoint has three types of processing for each inbound or outbound data packet (namely, a packet): discarding the data packet, skipping IPsec, or applying IPsec. The first processing manner means that the data packet is not processed, but is simply discarded. The second processing manner means that the data packet does not need IPsec protection, but instead, an IP header is added to a payload, and then an IP data packet is distributed. The third processing manner means that IPsec protection is provided for the data packet, and a provided security service, an applied protocol, a used algorithm, and the like need to be described in the security policy.

4. IPsec Tunnel

The IPsec tunnel is used to ensure IP communication security. A security association is established between IPsec peers (or endpoints) and a same policy is configured, to establish a secure IP packet transmission channel, so that the IP packet is encrypted at a local end and is decrypted at a peer end.

In a scenario in which an IKE obtains an IPsec tunnel through automatic negotiation for communication, there may be a fault scenario: For example, as shown in FIG. 1a, an IPsec tunnel is established between an end A and an end B to perform normal communication, but IKE SAs at the two ends of the IPsec tunnel cannot work normally due to various reasons, for example, there is an IPsec SA at one end (for example, the end A) of the IPsec tunnel, and there is no IPsec SA at the other end (for example, the end B). In this case, because a packet cannot be normally encrypted or decrypted at the end B lacking the IPsec SA, a data flow cannot be forwarded through the IPsec tunnel, and a service is interrupted. There are various reasons why there is originally the IPsec SA at the end B and subsequently the IPsec SA is lost, for example, a misoperation on a network device at the end B.

Figure 1B:
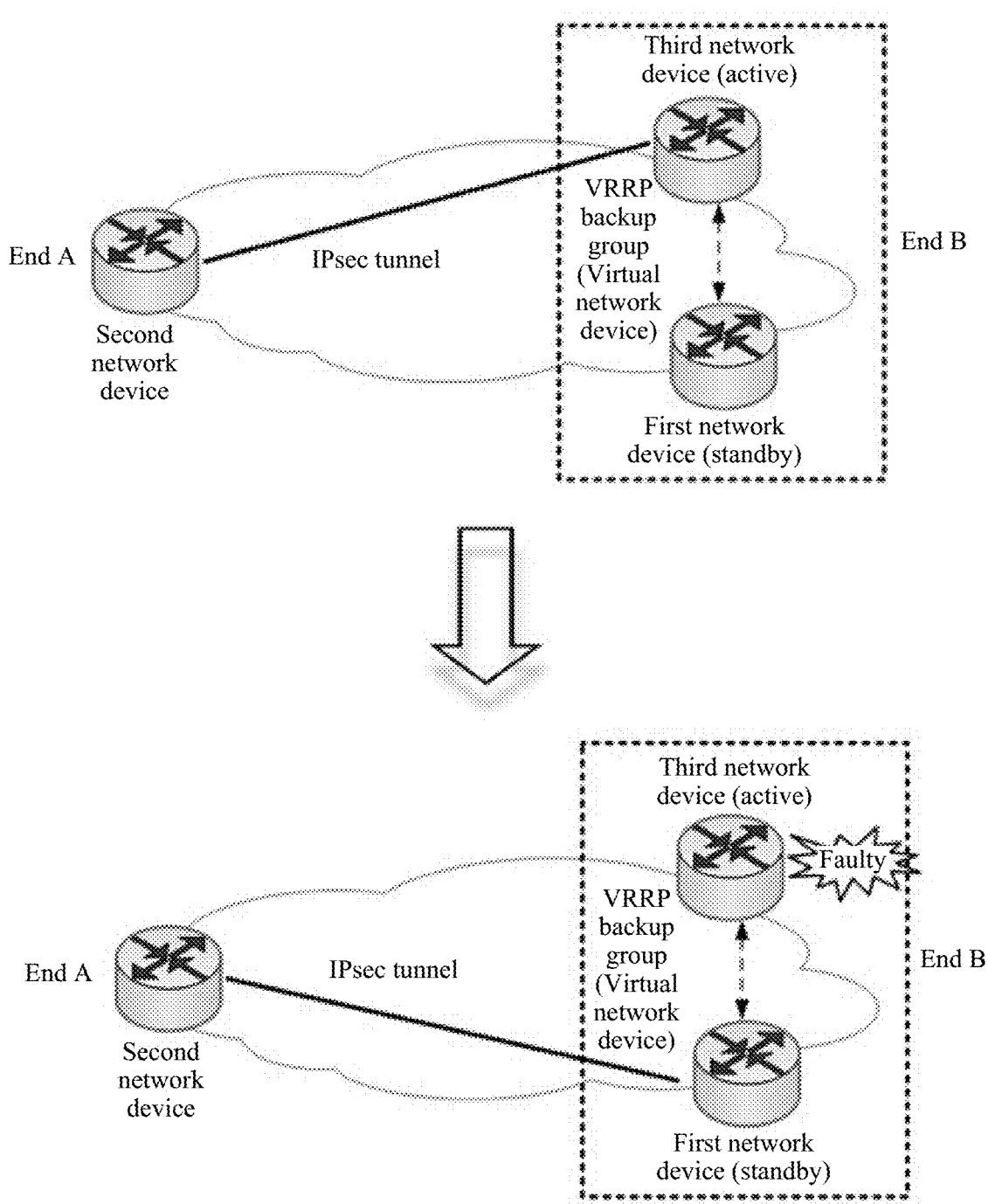
FIG. 1b is a schematic diagram of another application scenario of packet sending according to some embodiments.

For another example, the fault scenario is a scenario in which dual-node protection is used for the IPsec tunnel. When an active device is faulty, automatic switching is implemented by using a virtual router redundancy protocol (VRRP), and a data flow is forwarded by using a standby device, to ensure that a service is not interrupted. Negotiation over the IPsec SA is completed on the active device, but the active device and the standby device are switched before corresponding IPsec SA negotiation information is backed up to the standby device. In this case, there is no IPsec SA on the standby device. However, the active device has completed IPsec tunnel negotiation with a peer device before switching, and the IPsec SA that is negotiated with the active device exists on the peer device. In this case, when the active device in a network is faulty, there is an IPsec SA on the peer device, there is no IPsec SA on the standby device, and the standby device on which there is no IPsec SA cannot encrypt or decrypt a data flow, thereby causing service interruption. As shown in FIG. 1b, a virtual network device (namely, a VRRP backup group that has a virtual network IP address) is formed between a first network device and a third network device by running the VRRP protocol, the first network device is a standby device, and the third network device is an active device. An IPsec tunnel is established between an end A (a second network device) and an end B (the virtual network device) to transmit an IP data flow, to perform secure communication. When the active device (the third network device) on the end B is faulty, automatic switching is implemented by using the VRRP protocol, and the data flow is forwarded by using the standby device, thereby ensuring that forwarding of the data flow is not interrupted. However, when the IPsec tunnel is established, negotiation over an IPsec SA is completed on the second network device and the active device (the third network device). When IKE SAIKE SA on the active device has been backed up to the standby device (the first network device), and IPsec SA information has not been backed up to the standby device (the first network device), the active device and the standby device are switched, and in this case, there is no IPsec SA on the standby device. Consequently, when the active device in the network is faulty, there is an IPsec SA on the second network device, and there is no IPsec SA on the standby device (the first network device) (in other words, there is no IPsec SA on the virtual network device). The standby device on which there is no IPsec SA cannot encrypt or decrypt a data flow. Consequently, the data flow cannot be forwarded through the IPsec tunnel, thereby causing service interruption.

Before a life cycle of the IPsec SA expires, the second network device and the standby device re-establish a new IPsec SA through IKE negotiation. In this case, forwarding of the data flow is restored, and communication continues by using the standby device. However, a service restoration speed in this manner depends on a length of a specified life cycle. In a normal case, setting an excessively short life cycle causes frequent key negotiation, thereby occupying a large quantity of CPU resources of a device, and reducing processing performance of the device. Therefore, a relatively long life cycle is usually set. However, setting a relatively long life cycle causes an excessively long restoration time after a service is interrupted. An excessively long service interruption time reduces service processing efficiency and reduces service experience of a user.

The foregoing describes possible application scenarios related to the present disclosure, and based on this, the following further describes the embodiments of the present disclosure in detail.

Figure 2:
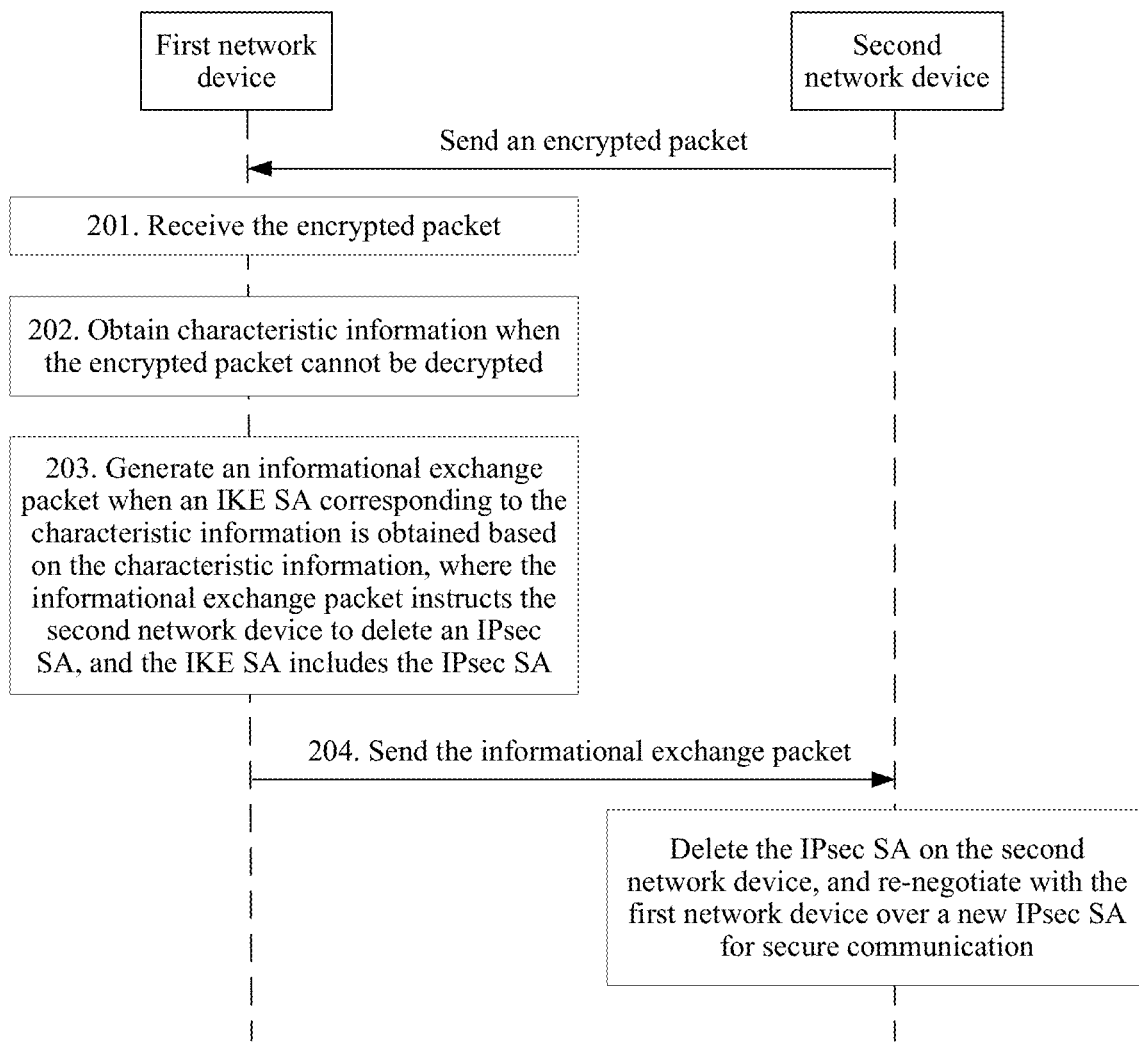
FIG. 2 is a schematic flowchart of a packet sending method according to some embodiments.

FIG. 2 is a schematic flowchart of a packet sending method according to some embodiments. The method is applied to a network scenario in which a first network device and a second network device performs internet protocol security IPsec communication, there is no IPsec SA on the first network device, and there is an IPsec SA on the second network device.

In an example, as shown in FIG. 1a, there is the IPsec tunnel from an end A to an end B, and there is no IPsec SA on the first network device because IPsec SA information on a first network device at the end B is lost due to a misoperation or another reason.

In another example, as shown in FIG. 1b, there is the IPsec tunnel from an end A to an end B, and the end B is a virtual network device. For example, a VRRP protocol is run to protect reliability of an active device (a third network device). When the active device is faulty, if IPsec SA information on the active device is not backed up to a standby device (a first network device), there is no IPsec SA on the first network device.

In some embodiments, the packet sending method includes parts 201, 202, 203, and 204. The following separately describes parts 201, 202, 203, and 204.

Part 201: The first network device receives an encrypted packet from the second network device, and decrypts the encrypted packet.

In some embodiments, the first network device searches, based on an IPsec SPI carried in the encrypted packet, for decryption information corresponding to an IPsec tunnel, for example, an IPsec SA. When the decryption information cannot be found, decryption cannot be performed.

In some embodiments, the first network device searches, based on a source IP address, a destination IP address, and a protocol number that are carried in the encrypted packet, for decryption information corresponding to an IPsec tunnel, for example, an IPsec SA. When the decryption information cannot be found, decryption cannot be performed.

In some embodiments, the first network device first searches (which is a first search), based on an IPsec SPI carried in the encrypted packet, for decryption information corresponding to an IPsec tunnel, for example, an IPsec SA. When the decryption information cannot be found, the first network device searches (which is a second search), based on a source IP address, a destination IP address, and a protocol number that are carried in the encrypted packet, for the decryption information corresponding to the IPsec tunnel. When the decryption information still cannot be found in this case, the first network device determines that decryption cannot be performed. Certainly, if the decryption information of the IPsec tunnel is found in this case, the first network device determines that decryption can be performed. In this two-time search manner, accuracy of determining whether decryption can be performed can be increased. The second search is to check a result of the first search, to effectively avoid a misjudgment.

Part 202: The first network device obtains characteristic information when the first network device cannot decrypt the encrypted packet.

Because there is no IPsec SA on the first network device (for possible reasons, refer to the descriptions in FIG. 1a and FIG. 1b), corresponding IPsec decryption cannot be performed on the encrypted packet that is from the second network device. In this case, the first network device obtains the characteristic information based on information carried in the encrypted packet. The characteristic information is associated with an IKE SA, and is used to indicate an IPsec SA. The first network device may find, based on the characteristic information, an IKE SA to which the IPsec SA indicated by the characteristic information belongs. The characteristic information may be an IPsec SPI, or may be a source IP address and a destination IP address. In addition, the characteristic information further includes a protocol number and/or an IKE identifier. The IKE identifier is used to identify ingress information of receiving an IPsec-encrypted packet by a network device, and the ingress information may be logical interface information, physical interface information, or VPN information. For example, the IKE identifier may be an identifier of a physical port, an identifier of a logical interface, an interface index (IF index) of a physical interface, an interface index of the logical interface, a virtual private network (VPN) identifier, a VPN index or a virtual routing and forwarding (English: Virtual Routing and Forwarding, VRF) identifier (ID). The IKE identifier may be obtained in the following manners:

(1) The first network device searches a mapping relationship between the destination IP address and the IKE identifier based on the destination IP address.

(2) The first network device searches a mapping relationship between the IKE identifier and a combination of the destination IP address and the source IP address based on the destination IP address and the source IP address.

(3) The first network device searches a mapping relationship between the IKE identifier and a combination of the destination IP address, the source IP address, and the protocol number based on the destination IP address, the source IP address, and the protocol number.

(4) The first network device searches a mapping relationship between the IKE identifier and a combination of the destination IP address, the source IP address, the protocol number, a source port number, and a destination port number based on the destination IP address, the source IP address, the protocol number, the source port number, and the destination port number.

It should be noted that in some embodiments, the foregoing processing is performed on a forwarding plane of the first network device (for example, an interface card or a forwarding card of the network device, which performs a function related to data packet forwarding). Then, the forwarding plane of the first network device sends the characteristic information to a control plane of the first network device (for example, a control card of the network device, which performs a control-related function such as a signaling protocol) for processing.

The control plane of the first network device finds, based on the received characteristic information, IKE SAIKE SA corresponding to the characteristic information. The IKE SAIKE SA includes at least one piece of the following information: IKE SPI information, time of a life cycle, a detection policy (a policy used to determine whether an IKE SA of a peer end exists) of corresponding dead peer detection (DPD), exchange key information (e.g., a key stored during previous exchange), and the like.

In some embodiments, the characteristic information is an IPsec SPI, and the first network device obtains the IKE SA based on a mapping relationship (as shown in Table 1) between the IPsec SPI and the IKE SA. Because the IPsec SPI may accurately represent the IPsec tunnel, a method for obtaining the IKE SA by using the IPsec SPI is relatively accurate, so that the first network device can send an informational exchange packet in a timely and accurate manner, thereby accelerating a service restoration speed.

TABLE 1

| Characteristic information | IKE SA |
|---|---|
| IPsec SPI | IKE SA |

In some embodiments, the characteristic information includes a source IP address and a destination IP address, and the first network device obtains the IKE SA based on a mapping relationship (as shown in Table 2) between the IKE SA and a combination of the source IP address and the destination IP address. The source IP address and the destination IP address cannot uniquely represent the IPsec tunnel, but when the IKE SA cannot be obtained by using the IPsec SPI, the IKE SA may be obtained by using the source IP address and the destination IP address, to improve fault tolerance of a device.

TABLE 2

| Characteristic information | IKE SA |
|---|---|
| Source IP address and destination IP address | IKE SA |

In some embodiments, the characteristic information includes a source IP address, a destination IP address, and an IKE identifier, and the first network device obtains the IKE SA based on a mapping relationship (as shown in Table 3) between the IKE SA and a combination of the source IP address, the destination IP address, and the IKE identifier. In this manner, the IKE identifier is introduced, so that fault tolerance is improved, and further, accuracy is improved to some extent.

TABLE 3

| Characteristic information | IKE SA |
|---|---|
| Source IP address, destination IP address, and IKE identifier | IKE SA |

In some embodiments, the characteristic information includes a source IP address, a destination IP address, and a protocol number, and the first network device obtains the IKE SA based on a mapping relationship (as shown in Table 4) between the IKE SA and a combination of the source IP address, the destination IP address, and the protocol number. In this manner, the protocol number is introduced, so that fault tolerance is improved, and further, accuracy is improved to some extent.

TABLE 4

| Characteristic information | IKE SA |
| --- | --- |
| Source IP address, destination IP address, and protocol number | IKE SA |

In some embodiments, the characteristic information includes a source IP address, a destination IP address, an IKE identifier, and a protocol number, and the first network device obtains the IKE SA based on a mapping relationship (as shown in Table 5) between the IKE SA and a combination of the source IP address, the destination IP address, the IKE identifier, and the protocol number. In this manner, the protocol number and the IKE identifier are introduced, so that fault tolerance is improved, and further, accuracy is improved.

TABLE 5

| Characteristic information | IKE SA |
| --- | --- |
| Source IP address, destination IP address, protocol number, and IKE identifier | IKE SA |

It should be noted that any mapping relationship in Table 1 to Table 5 may be stored on the first network device in a form of a mapping table, and may be established through manual configuration, generated through automatic calculation by running a protocol such as IKE, or obtained from another device, and the mapping relationship may be updated based on an actual situation.

In some embodiments, when the first network device cannot obtain, based on the characteristic information, the internet key exchange IKE SA corresponding to the characteristic information, the first network device discards the encrypted packet. The encrypted packet is discarded, so that accumulation of useless packets on the device is avoided, and occupation of storage space of the device is reduced.

Part 203: A control plane of the first network device generates an informational exchange packet based on the IPsec SPI (carried in the encrypted packet described in part 201) when the first network device obtains, based on the characteristic information, the IKE SA corresponding to the characteristic information, where the informational exchange packet instructs the second network device to delete the IPsec SA.

Figure 3:
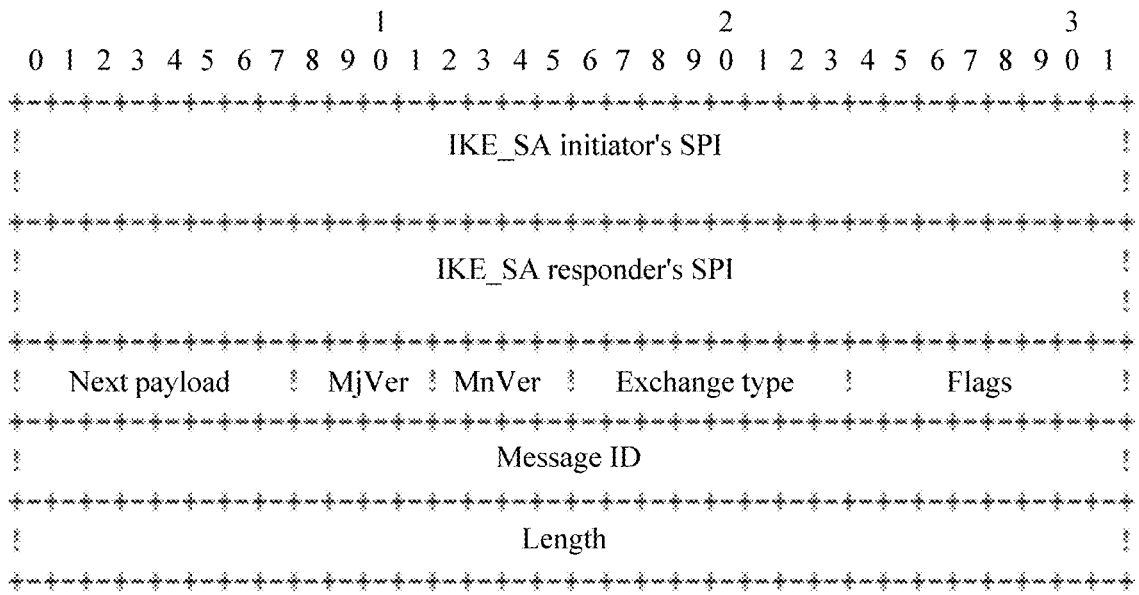
FIG. 3 is a schematic diagram of a field format of an IKE header according to some embodiments.

In some embodiments, the informational exchange packet includes a flag bit and the IPsec SPI, and the flag bit is used to instruct a network device that receives the informational exchange packet to delete an IPsec SA that is on the network device and that corresponds to the IPsec SPI. In some embodiments, after the IKE SA is obtained, it indicates that IKE negotiation can operate normally. In an IKE SA negotiation operation process, a control message such as an error or a notification in a specific case needs to be transmitted between IPsec peers. Therefore, the informational exchange packet is defined in the IKE. A format of an IKE header defined in the IKE is shown in FIG. 3, and includes an IKE SA initiator's SPI field, an IKE SA responder's SPI field, a next payload field, a major version field, a minor version field, an exchange type field, a flag field, a message identifier field, and a length field.

For example, the first network device sets a value of the exchange type field to 37, indicating that the packet is an informational exchange packet, and sets a value of the next payload field to 42, indicating that a delete payload field is carried behind the IKE header.

Figure 4:
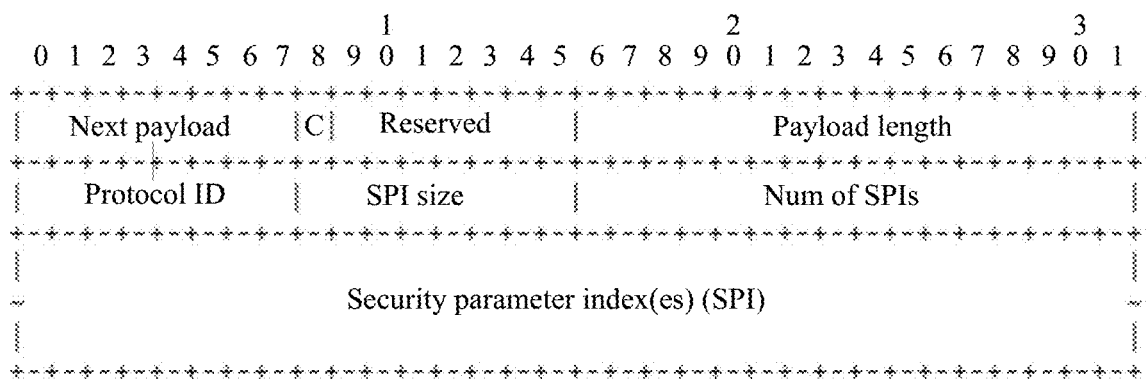
FIG. 4 is a schematic diagram of a field format of a delete payload according to some embodiments.

A format of the delete payload field is shown in FIG. 4, and includes a next payload field, a C field, a reserved field, a payload length field, a protocol identifier field, an SPI size field, an SPI quantity field, and an SPI(es) field. The SPI(es) field carries the IPsec SPI. The informational exchange packet is used to instruct the second network device to delete an IPsec SA corresponding to the IPsec SPI.

For details about the informational exchange packet reference may be made to a request for comments (RFC) 7296 published by the internet engineering task force (IETF). Content of a related part in this document is incorporated in this specification by reference in its entirety. For brevity, details are not described herein.

It should be further noted that the IPsec SA and the IPsec SA information have a same meaning in each embodiment, and may be interchanged. Similarly, the IKE SA and the IKE SA may also be interchanged. "First" in the first network device, "second" in the second network device, and "third" in the third network device described in this disclosure are merely used to distinguish between different network devices. In some embodiments, the second network device is used as a transmit end of an IPsec encrypted packet, and the first network device and the third network device are used as a receive end of the IPsec encrypted packet.

Part 204: The first network device sends the informational exchange packet to the second network device.

In some embodiments, for sending of the informational exchange packet, refer to part 203 and an IKE SA negotiation process defined by the IETF. For brevity, details are not described herein again.

After receiving the informational exchange packet, the second network device finds, based on the IPsec SPI carried in the informational exchange packet, an IPsec SA corresponding to the IPsec SPI, and deletes the IPsec SA. If there is no IPsec SA on the second network device, a new round of IPsec SA negotiation is initiated. The second network device sends a negotiation packet to the first network device, and the negotiation packet is used to negotiate the new IPsec SA.

The first network device receives the negotiation packet sent by the second network device after the second network device deletes the IPsec SA, and generates the new IPsec SA based on the negotiation packet, to decrypt a subsequently received encrypted packet by using the new IPsec SA.

The second network device is triggered, in a timely and automatic manner, to re-initiate negotiation with the first network device over the new IPsec SA, thereby shortening a service interruption time, improving service processing efficiency, and improving user experience.

Figure 5A:
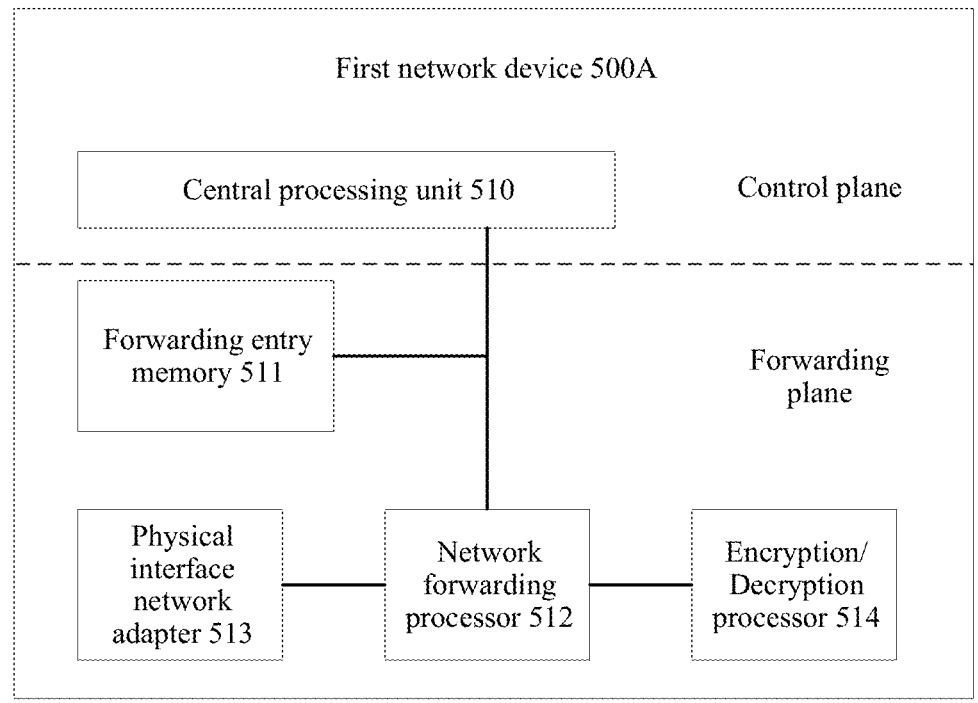
FIG. 5a is a schematic structural diagram of a first network device according to some embodiments.

FIG. 5a is a schematic structural diagram of the first network device in accordance with one or more embodiments. A first network device 500A includes a central processing unit 510, a forwarding entry memory 511, a physical interface network adapter 513, a network forwarding processor 512, and an encryption/decryption processor 514. A control plane performs a control-related function such as a signaling protocol, and a forwarding plane performs a function related to data packet forwarding. In a multi-card device structure, the control plane is an independent main control card, and the main control card includes the central processing unit 510; and the forwarding plane is an independent forwarding card or interface card, and the forwarding card includes the forwarding entry memory 511, the physical interface network adapter 513, the network forwarding processor 512, and the encryption/decryption processor 514. In a single-card device structure, the forwarding plane and the control plane are integrated into one card, and include the central processing unit 510 that performs a control management function, and the forwarding entry memory 511, the physical interface network adapter 513, the network forwarding processor 512, and the encryption/decryption processor 514 that perform a forwarding plane function.

When the first network device 500A receives, from the physical interface network adapter 513, an encrypted packet sent by the second network device, the physical interface network adapter 513 sends the encrypted packet to the network forwarding processor 512. When the network forwarding processor 512 cannot find (in other words, cannot decrypt) a corresponding IPsec SA from the forwarding entry memory 511 based on characteristic information (the characteristic information is consistent with related descriptions of related characteristic information in FIG. 2; for the characteristic information, refer to the related descriptions of related characteristic information in FIG. 2; and details are not described herein again) in the encrypted packet, the network forwarding processor 512 sends the encrypted packet to the central processing unit 510 on the control plane. The central processing unit 510 constructs an informational exchange packet (carrying the IPsec SPI) based on negotiation information, and sends the informational exchange packet to the second network device, to instruct the second network device to delete an IPsec SA corresponding to the IPsec SPI, and to re-initiate negotiation to create a new IPsec SA. The central processing unit 510 performs a function step of part 203 in FIG. 2, and the network forwarding processor 512 performs function steps of parts 201, 202, and 204 in FIG. 2. For details, refer to the foregoing related descriptions. The details are not described herein again.

When the first network device 500A receives, from the physical interface network adapter 513, a new encrypted packet sent by the second network device, the physical interface network adapter 513 sends the new encrypted packet to the network forwarding processor 512. When the network forwarding processor 512 finds a corresponding IPsec SA from the forwarding entry memory 511 based on characteristic information in the new encrypted packet, the network forwarding processor 512 sends the new encrypted packet to the encryption/decryption processor 514 for decryption processing, and then sends a decrypted packet to the network forwarding processor 512. The network forwarding processor 512 searches a forwarding table in the forwarding entry memory 511 based on destination IP address of the decrypted packet, to forward the decrypted packet.

The first network device 500A in this embodiment may correspond to the first network device in the embodiments corresponding to FIG. 1a to FIG. 4. The central processing unit 510, the forwarding entry memory 511, the physical interface network adapter 513, the network forwarding processor 512, and the like in the first network device 500A can implement functions of the first network device in the embodiments corresponding to FIG. 1a to FIG. 4 and/or steps implemented by the first network device in the embodiments corresponding to FIG. 1a to FIG. 4. The central processing unit 510 performs the function step of part 203 in FIG. 2, and the network forwarding processor 512, the forwarding entry memory 511, and the physical interface network adapter 513 perform the function steps of parts 201, 202, and 204 in FIG. 2. For detailed content, refer to the foregoing related descriptions. For brevity, details are not described herein again.

It should be noted that, in some embodiments, the first network device 500A is applied to a software-defined networking (SDN) architecture that is based on control and forwarding separation. A control plane function and a forwarding plane function of the first network device 500A are separated into two independent network devices, for example, a controller and a forwarding device. The controller includes a central processing unit 510, and the forwarding device includes a forwarding entry memory 511, a physical interface network interface adapter 513, a network forwarding processor 512, an encryption/decryption processor 514, and the like. Correspondingly, the foregoing components (the central processing unit 510, the forwarding entry memory 511, the physical interface network adapter 513, the network forwarding processor 512, and the encryption/decryption processor 514) separately performs functions and actions performed by the corresponding components in FIG. 5a. For detailed content, refer to the foregoing related descriptions. For brevity, details are not described herein again.

Figure 5B:
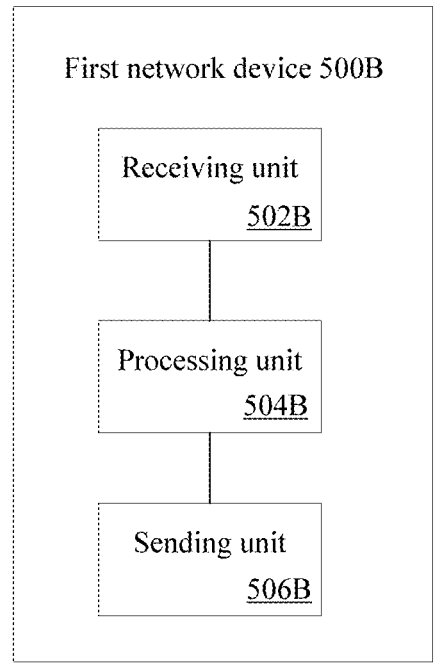
FIG. 5b is a schematic structural diagram of another first network device according to some embodiments.

FIG. 5b is a schematic structural diagram of the first network device in accordance with one or more embodiments. A first network device 500B is applied to a network scenario in which the first network device and a second network device perform internet protocol security IPsec communication, there is no IPsec security association SA on the first network device, and there is an IPsec SA on the second network device. The first network device includes a processing unit 504B, a receiving unit 502B, and a sending unit 506B.

The receiving unit 502B is configured to receive an encrypted packet from the second network device.

The processing unit 504B is configured to obtain characteristic information when the processing unit 504B cannot decrypt the encrypted packet.

The processing unit 504B cannot decrypt the encrypted packet in the following several cases:

(1) The processing unit 504B cannot obtain the IPsec SA based on an IPsec SPI in the encrypted packet;

(2) The processing unit 504B cannot obtain the IPsec SA based on a source IP address and a destination IP address in the encrypted packet;

(3) The processing unit 504B cannot obtain the IPsec SA based on the source IP address, the destination IP address, and a protocol number that are in the encrypted packet; or (4) The processing unit 504B cannot obtain the IPsec SA based on the IPsec SPI in the encrypted packet, and cannot obtain the IPsec SA based on the source IP address, the destination IP address, and the protocol number that are in the encrypted packet.

The processing unit 504B is further configured to generate an informational exchange packet when the processing unit 504B obtains, based on the characteristic information, an IKE SA corresponding to the characteristic information. The informational exchange packet instructs the second network device to delete the IPsec SA on the second network device. The sending unit 506B is configured to send the informational exchange packet to the second network device.

The processing unit 504B is further configured to discard the encrypted packet when the processing unit 504B cannot obtain, based on the characteristic information, the IKE SA corresponding to the characteristic information.

That the processing unit 504B obtains, based on the characteristic information, an IKE SA corresponding to the characteristic information may include the following several possible implementations:

(1) The characteristic information includes an IPsec security parameter index SPI. The processing unit 504B obtains the IKE SA based on a mapping relationship between the IPsec SPI and the IKE SA.

(2) The characteristic information includes a source IP address and a destination IP address. The processing unit 504B obtains the IKE SA based on a mapping relationship between the IKE SA and a combination of the source IP address and the destination IP address.

(3) The characteristic information includes a source IP address, a destination IP address, and an IKE identifier. The processing unit 504B obtains the IKE SA based on a mapping relationship between the IKE SA and a combination of the source IP address, the destination IP address, and the IKE identifier.

(4) The characteristic information includes a source IP address, a destination IP address, and a protocol number. The processing unit 504B obtains the IKE SA based on a mapping relationship between the IKE SA and a combination of the source IP address, the destination IP address, and the protocol number.

(5) The characteristic information includes a source IP address, a destination IP address, an IKE identifier, and a protocol number. The processing unit 504B obtains the IKE SA based on a mapping relationship between the IKE SA and a combination of the source IP address, the destination IP address, the IKE identifier, and the protocol number.

The processing unit 504B is further configured to obtain the IKE identifier based on a mapping relationship between the destination IP address and the IKE identifier.

The receiving unit 502B is further configured to receive a negotiation packet sent by the second network device after the second network device deletes the IPsec SA.

The processing unit 504B is further configured to generate a new IPsec SA based on the negotiation packet, to decrypt a subsequently received encrypted packet.

In some embodiments, the first network device 500B corresponds to the first network device in the foregoing packet sending method embodiment. In addition, each module in the first network device 500B and the foregoing other operations and/or functions are separately used to implement various steps and methods implemented by the first network device in the embodiments corresponding to FIG. 1a to FIG. 4. The processing unit 504B performs function steps of parts 202 and 203 in FIG. 2, the receiving unit 502B performs a function step of part 201 in FIG. 2, and the sending unit 506B performs a function step of part 204 in FIG. 2. For detailed content, refer to the foregoing related descriptions. For brevity, details are not described herein again.

Figure 5C:
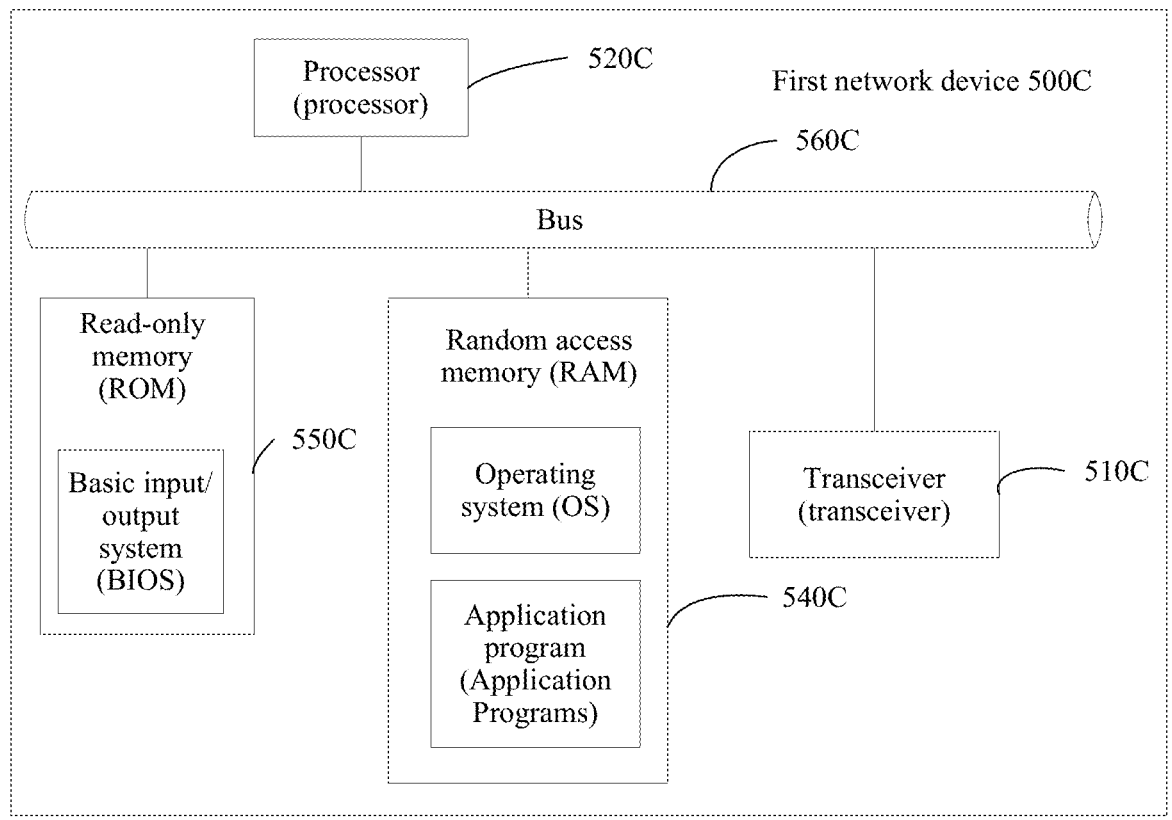
FIG. 5c is a schematic structural diagram of still another first network device according to some embodiments.

FIG. 5c is a schematic structural diagram of the first network device in accordance with one or more embodiments. A first network device 500C includes a transceiver 510C, a processor 520C, a random access memory 540C, a read-only memory 550C, and a bus 560C. The processor 520 is separately coupled to the transceiver 510C, the random access memory 540C, and the read-only memory 550C by using the bus 560C. When the first network device 500C needs to be run, the first network device 500C is started by using a basic input/output system built into the read-only memory 550C or a bootloader booting system in an embedded system, to boot the first network device 500C to enter a normal running state. After entering the normal running state, the first network device 500C runs an application program and an operating system in the random access memory 540C, to implement the following functions.

The transceiver 510C is configured to receive an encrypted packet from a second network device. The processor 520C is configured to obtain characteristic information when the processor 520C cannot decrypt the encrypted packet. The processor 520C is further configured to generate an informational exchange packet when the processor 520C obtains, based on the characteristic information, an IKE SA corresponding to the characteristic information. The informational exchange packet instructs the second network device to delete an IPsec SA on the second network device. The transceiver 510C is further configured to send the informational exchange packet to the second network device.

The processor 520C is further configured to discard the encrypted packet when the processor 520C cannot obtain, based on the characteristic information, the IKE SA corresponding to the characteristic information.

The transceiver 510C is further configured to receive a negotiation packet sent by the second network device after the second network device deletes the IPsec SA.

The processor 520C is further configured to generate a new IPsec SA based on the negotiation packet, to decrypt a subsequently received encrypted packet.

In some embodiments, the first network device 500C corresponds to the first network device in the embodiments corresponding to FIG. 1a to FIG. 4. In addition, the processor 520C, the transceiver 510C, and the like in the first network device 500C can implement functions of the first network device in the embodiments corresponding to FIG. 1a to FIG. 4 and/or steps and methods implemented by the first network device in the embodiments corresponding to FIG. 1a to FIG. 4. The processor 520C is configured to perform all operations of the processing unit 504B of the first network device in FIG. 5b, and the transceiver 510C is configured to perform all operations of the receiving unit 502B and the sending unit 506B of the first network device in FIG. 5b. The processor 520C performs function steps of parts 202 and 203 in FIG. 2, and the transceiver 510C performs function steps of parts 201 and 204 in FIG. 2. For detailed content, refer to the foregoing related descriptions. For brevity, details are not described herein again.

It should be noted that in this embodiment, the first network device may be alternatively implemented based on a general physical server with reference to a network functions virtualization (NFV) technology, and the first network device is a virtual first network device (for example, a virtual router or a virtual switch). The virtual first network device may be a virtual machine (VM) on which a program used for a packet sending function runs, and the virtual machine is deployed on a hardware device (for example, a physical server). The virtual machine is a complete computer system that is simulated by using software and that has a function of a complete hardware system and runs in a completely isolated environment. After reading this application, a person skilled in the art may virtualize a plurality of first network devices with the foregoing functions on the general physical server with reference to the NFV technology. Details are not described herein.

It should be understood that, based on this application, a person skilled in the art can combine optional features, steps, or methods that are described in the embodiments of this application without creative efforts, and this belongs to the embodiments disclosed in this application. For brevity, descriptions of different combinations are not repeatedly provided.

It should be understood that, based on this application, a person skilled in the art can combine optional features, steps, or methods that are described in the embodiments of this application without creative efforts, and this belongs to the embodiments disclosed in this application. For brevity, descriptions of different combinations are not repeatedly provided.

It should be understood that the term "and/or" in this specification describes only an association relationship for describing associated objects and represents that three relationships may exist. For example, A and/or B may represent the following three cases: only A exists, both A and B exist, and only B exists. In addition, the character "I" in this specification generally indicates an "or" relationship between the associated objects.

It should be understood that sequence numbers of the foregoing processes do not mean execution sequences in the discussed embodiments. The execution sequences of the processes should be determined based in functions and internal logic of the processes, and should not be construed as any limitation on the implementation processes of the discussed embodiments.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In some embodiments, functional units in the discussed embodiments are optionally integrated into one processing unit, or each of the units exists alone physically, or two or more units are integrated into one unit.

When the functions are implemented in a form of a software functional unit and sold or used as an independent product, the functions may be stored in a computer readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the discussed embodiments. The foregoing storage medium includes: any medium that can store program code, such as a USB flash drive, a removable hard disk, a read-only memory (ROM), a random access memory (RAM), a magnetic disk, or an optical disc.

The foregoing descriptions are merely example embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method, comprising: obtaining, by a first network device comprising a processor, characteristic information from an encrypted packet received from a second network device based on a determination that the first network device cannot decrypt the encrypted packet, wherein the first network device is free from having an internet protocol security (IPsec) security association (SA), and the second network device has the IPsec SA;
   generating, by the first network device, an informational exchange packet when the first network device obtains, based on the characteristic information, an internet key exchange (IKE) SA corresponding to the characteristic information, wherein the informational exchange packet instructs the second network device to delete the IPsec SA on the second network device; and
   sending, by the first network device, the informational exchange packet to the second network device.

2. The method according to claim 1, further comprising:
   receiving, by the first network device, a negotiation packet sent by the second network device after the second network device deletes the IPsec SA; and
   generating a new IPsec SA based on the negotiation packet, to decrypt a subsequently received encrypted packet.

3. The method according to claim 1, further comprising:
   discarding the encrypted packet based on a determination that the first network device cannot obtain, based on the characteristic information, the IKE SA corresponding to the characteristic information.

4. The method according to claim 1, wherein the characteristic information comprises an IPsec security parameter index (SPI), and the method further comprises:
   obtaining, by the first network device, the IKE SA based on a mapping relationship between the IPsec SPI and the IKE SA.

5. The method according to claim 1, wherein the characteristic information comprises a source IP address and a destination IP address, and the method further comprises:
   obtaining, by the first network device, the IKE SA based on a mapping relationship between the IKE SA and the source IP address and the destination IP address.

6. The method according to claim 1, wherein the characteristic information comprises a source IP address, a destination IP address and an IKE identifier, and the method further comprises:

obtaining, by the first network device, the IKE SA based on a mapping relationship between the IKE SA and the source IP address, the destination IP address, and the IKE identifier.

7. The method according to claim 1, wherein the characteristic information comprises a source IP address, a destination IP address and a protocol number, and the method further comprises:
obtaining, by the first network device, the IKE SA based on a mapping relationship between the IKE SA and the source IP address, the destination IP address, and the protocol number.

8. The method according to claim 1, wherein the characteristic information comprises a source IP address, a destination IP address and an IKE identifier and a protocol number, and the method further comprises:
obtaining, by the first network device, the IKE SA based on a mapping relationship between the IKE SA and the source IP address, the destination IP address, the IKE identifier, and the protocol number.

9. The method according to claim 1, wherein the determination that the first network device cannot decrypt the encrypted is based on one or more of:
an IPsec security parameter index SPI in the encrypted packet;
a source IP address and a destination IP address in the encrypted packet; or
the source IP address, the destination IP address, and a protocol number that are in the encrypted packet.

10. An apparatus, comprising:
a processor; and
a memory having computer-readable instructions stored thereon that, when executed by the processor, cause the apparatus to:
obtain characteristic information from an encrypted packet received from a network device based on a determination that the apparatus cannot decrypt the encrypted packet, wherein the apparatus is free from having an internet protocol security (IPsec) security association (SA), and the network device has the IPsec SA;
generate an informational exchange packet when the apparatus obtains, based on the characteristic information, an internet key exchange (IKE) SA corresponding to the characteristic information, wherein the informational exchange packet instructs the network device to delete the IPsec SA on the network device; and
send the informational exchange packet to the network device.

11. The apparatus according to claim 10, wherein the apparatus is further caused to:
receive a negotiation packet sent by the network device after the network device deletes the IPsec SA; and
generate a new IPsec SA based on the negotiation packet, to decrypt a subsequently received encrypted packet.

12. The apparatus according to claim 10, wherein the apparatus is further caused to:
discard the encrypted packet based on a determination that the apparatus cannot obtain, based on the characteristic information, the IKE SA corresponding to the characteristic information.

13. The apparatus according to claim 10, wherein the characteristic information comprises an IPsec security parameter index (SPI), and the apparatus is further caused to:
obtain the IKE SA based on a mapping relationship between the IPsec SPI and the IKE SA.

14. The apparatus according to claim 10, wherein the characteristic information comprises a source IP address and a destination IP address, and the apparatus is further caused to:
obtain the IKE SA based on a mapping relationship between the IKE SA and the source IP address and the destination IP address.

15. The apparatus according to claim 10, wherein the characteristic information comprises a source IP address, a destination IP address and an IKE identifier, and the apparatus is further caused to:
obtain the IKE SA based on a mapping relationship between the IKE SA and the source IP address, the destination IP address, and the IKE identifier.

16. The apparatus according to claim 10, wherein the characteristic information comprises a source IP address, a destination IP address and a protocol number, and the apparatus is further caused to:
obtain the IKE SA based on a mapping relationship between the IKE SA and the source IP address, the destination IP address, and the protocol number.

17. The apparatus according to claim 10, wherein the characteristic information comprises a source IP address, a destination IP address and an IKE identifier and a protocol number, and the apparatus is further caused to:
obtain the IKE SA based on a mapping relationship between the IKE SA and the source IP address, the destination IP address, the IKE identifier, and the protocol number.

18. The apparatus according to claim 10, wherein the determination that the apparatus cannot decrypt the encrypted is based on one or more of:
an IPsec security parameter index SPI in the encrypted packet;
a source IP address and a destination IP address in the encrypted packet; or
the source IP address, the destination IP address, and a protocol number that are in the encrypted packet.

19. A non-transitory computer-readable medium having instructions stored thereon that, when executed by a processor, cause an apparatus to:
obtain characteristic information from an encrypted packet received from a network device based on a determination that the apparatus cannot decrypt the encrypted packet, wherein the apparatus is free from having an internet protocol security (IPsec) security association (SA), and the network device has the IPsec SA;
generate an informational exchange packet when the apparatus obtains, based on the characteristic information, an internet key exchange (IKE) SA corresponding to the characteristic information, wherein the informational exchange packet instructs the network device to delete the IPsec SA on the network device; and
send the informational exchange packet to the network device.

20. The non-transitory computer-readable medium according to claim 19, wherein the apparatus is further caused to:
receive a negotiation packet sent by the network device after the network device deletes the IPsec SA; and
generate a new IPsec SA based on the negotiation packet, to decrypt a subsequently received encrypted packet.

* * * * *

UNITED STATES PATENT AND TRADEMARK OFFICE
CERTIFICATE OF CORRECTION

| | | |
|---|---|---|
| PATENT NO. | : 11,277,391 B2 | |
| APPLICATION NO. | : 16/710993 | |
| DATED | : March 15, 2022 | |
| INVENTOR(S) | : Lihua Mao et al. | |

It is certified that error appears in the above-identified patent and that said Letters Patent is hereby corrected as shown below:

In the Specification

Column 17, Lines 4-11 should be replaced with:
It should be understood that the term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

Signed and Sealed this
Twenty-sixth Day of April, 2022

Katherine Kelly Vidal
*Director of the United States Patent and Trademark Office*